(12) United States Patent
Tsuwano et al.

(10) Patent No.: US 9,733,872 B2
(45) Date of Patent: Aug. 15, 2017

(54) INFORMATION PROCESSING APPARATUS, INFORMATION PROCESSING METHOD, AND COMPUTER PROGRAM PRODUCT

(71) Applicants: Fumiko Tsuwano, Tokyo (JP); Masahide Horiuchi, Tokyo (JP); Hiroki Yamamoto, Tokyo (JP)

(72) Inventors: Fumiko Tsuwano, Tokyo (JP); Masahide Horiuchi, Tokyo (JP); Hiroki Yamamoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/657,103

(22) Filed: Mar. 13, 2015

(65) Prior Publication Data

US 2015/0262047 A1    Sep. 17, 2015

(30) Foreign Application Priority Data

Mar. 17, 2014    (JP) ................................ 2014-054214

(51) Int. Cl.
    *G06F 3/12*    (2006.01)
(52) U.S. Cl.
    CPC ..................................... *G06F 3/12* (2013.01)

(58) Field of Classification Search
    CPC .......................... G06K 15/1878; G06K 15/188
    See application file for complete search history.

(56) References Cited

U.S. PATENT DOCUMENTS

2006/0188295 A1*    8/2006    Kasiske ............. G03G 15/0121
                                                                399/182
2012/0062956 A1*    3/2012    Kitagawa ........... G03G 15/6585
                                                                358/2.1
2013/0271792 A1    10/2013    Awamura et al.

FOREIGN PATENT DOCUMENTS

JP            2013-219697            10/2013

* cited by examiner

*Primary Examiner* — Christopher D Wait
(74) *Attorney, Agent, or Firm* — Cooper & Dunham LLP

(57) ABSTRACT

An information processing apparatus includes: an object aggregating unit configured to aggregate spot color objects that are object to be printed in respective spot colors, for each of types of the spot color objects based on drawing information indicating the spot colors or methods of printing in the spot colors, to place the spot color objects on spot color layers corresponding to the types.

5 Claims, 10 Drawing Sheets

FIG.7
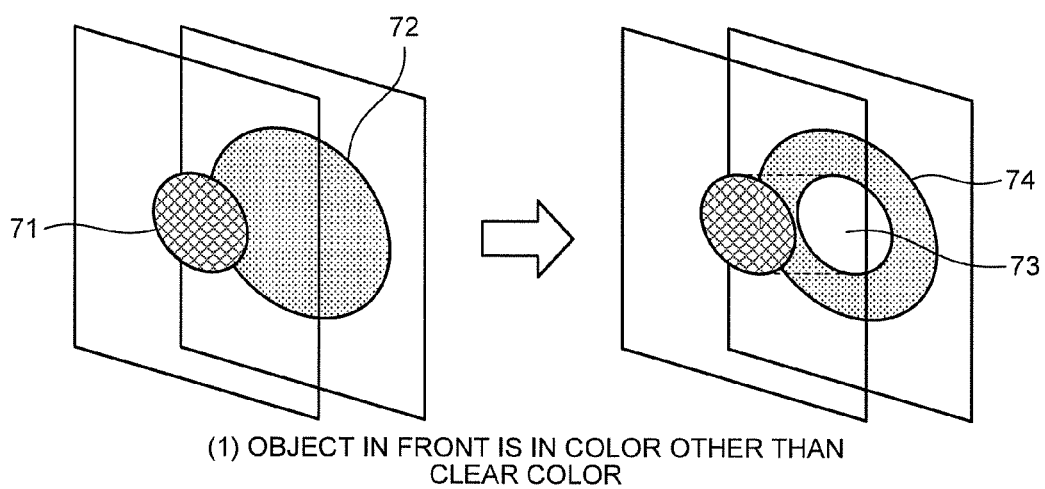
(1) OBJECT IN FRONT IS IN COLOR OTHER THAN CLEAR COLOR
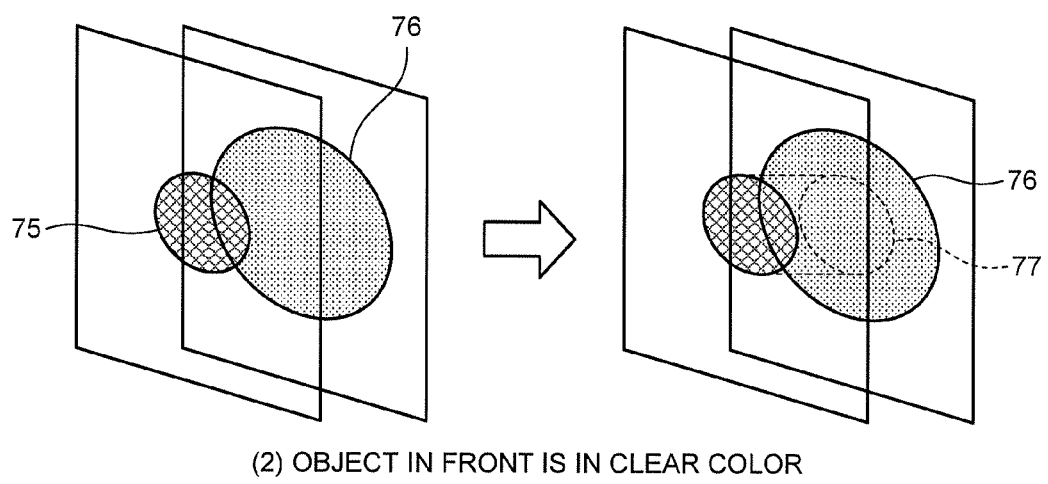
(2) OBJECT IN FRONT IS IN CLEAR COLOR

INFORMATION PROCESSING APPARATUS, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2014-054214 filed in Japan on Mar. 17, 2014.

BACKGROUND OF THE INVENTION

1. Field of the Invention

The present invention relates to an information processing apparatus, an information processing method, and a computer program product.

2. Description of the Related Art

Image forming apparatuses that install a colorless clear toner or spot color inks such as while, gold, and silver in addition to the toners of four colors of cyan (C), magenta (M), yellow (Y), and black (K) thereon so as to form an image on a recoding medium such as transfer paper, control gloss or control the image quality have actively been developed in these years.

Additionally, application software for editing the image data to be output to such an image forming apparatus has also been developed. For example, there is application software (a spot color object editing application) that draws, places, or edits an object to be printed with the spot color inks, for example, in an image file in Portable Document Format (PDF) or another format.

For example, Japanese Patent Application Laid-open No. 2013-219697 discloses a technique that implements an image that an user desires by designating which area to prioritize when areas in which the clear toner is used overlap, for example, the overlap of an area in which a transparent image is formed, and an area in which a surface effect such as a glossy tone is given.

By the way, some image forming apparatuses compatible with the spot color inks can install only a spot color ink. Such image forming apparatuses fail to print spot color objects in a plurality of colors simultaneously. Thus, it is conventionally necessary to separately perform the print process for each spot color object by designating the spot color object one by one and then setting a spot color toner corresponding to the spot color object when the image file includes spot color objects in two colors or more. Thus, a more efficient printing process has been required.

In light of the foregoing, there is a need to provide an information processing apparatus, information processing method, and a computer program product that can efficiently print an image including spot color objects in a plurality of colors in an image forming apparatus that can perform spot color printing only in one spot color at one time.

SUMMARY OF THE INVENTION

It is an object of the present invention to at least partially solve the problems in the conventional technology.

An information processing apparatus includes: an object aggregating unit configured to aggregate spot color objects that are object to be printed in respective spot colors, for each of types of the spot color objects based on drawing information indicating the spot colors or methods of printing in the spot colors, to place the spot color objects on spot color layers corresponding to the types.

An information processing method is in an information processing apparatus. The method includes: aggregating spot color objects that are objects to be printed in respective spot colors, for each of types of the spot color objects based on drawing information indicating the spot colors or methods of printing in the spot colors, to place the spot color objects on spot color layers corresponding to the types.

A computer program product includes a non-transitory computer-readable medium containing an information processing program. The program causes a computer to perform: aggregating spot color objects that are objects to be printed in respective spot colors, for each of types of the spot color objects based on drawing information indicating the spot colors or methods of printing in the spot colors, to place the spot color objects on spot color layers corresponding to the types.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a schematic view briefly illustrating a process for removing overlapping areas and generating an object;

DETAILED DESCRIPTION OF THE PREFERRED EMBODIMENTS

The information processing apparatus, information processing method, and a computer program product according to the present invention will be described in detail hereinafter with reference to the appended drawings.

Figure 1:
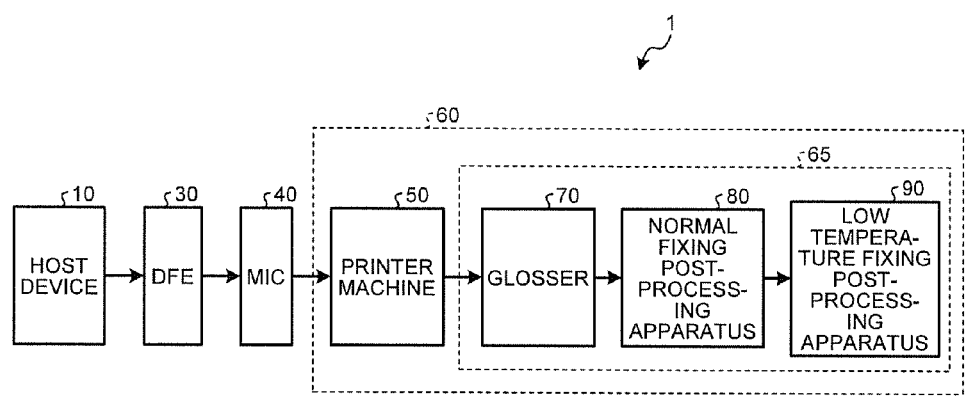
FIG. 1 is a schematic view of the configuration of an image forming system according to the present embodiment.

FIG. 1 is a schematic view of the configuration of an image forming system 1 according to the present embodiment. As illustrated in FIG. 1, the image forming system 1 according to the present embodiment includes a host device 10, a printer control device (Digital Front End: DFE) (hereinafter, referred to as DFE) 30, an interface controller (Mechanism Interface Controller: MIC) (hereinafter, sometimes referred to as MIC) 20, and a printer 60. The host device 10, DFE 30, MIC 20, and printer 60 are connected through a wired or wireless communication line so as to send and receive data each other.

The DFE 30 controls the formation of an image in the printer 60 by communicating with the printer 60 through the MIC 20. The host device 10 such as a Personal Computer (PC) is connected to the DFE 30. The DFE 30 receives the image data from the host device 10. The DFE 30 generates the image data such that the printer 60 forms a toner image corresponding to each of CMYK toners and a clear toner using the image data. Then, the DFE 30 sends the generated image data through the MIC 20 to the printer 60.

In the example of FIG. 1, the printer 60 includes a printer machine 50, and a post-processing device 65. The printer machine 50 installs at least each of the CMYK toners. For example, an image formation unit including a photoconductor, a charging unit, a developing device and a photoconductor cleaner, and an exposing device are installed for each of the toners. The printer machine 50 irradiates the photoconductor with a light beam from the exposing device in accordance with the image data transmitted through the MIC 20 from the DFE 30 to form a toner image corresponding to each of the toners on the photoconductor. Then, the printer machine 50 transfers the toner image to a recoding medium such as recording paper. The transferred toner image is heated and pressurized at a temperature in a predetermined range (a normal temperature) in a fixing machine (not illustrated). This fixes the transferred toner image on the recording medium. This forms an image on the recording medium.

In the example of FIG. 1, the post-processing device 65 includes a glosser 70 connected to the printer machine 50, a normal fixing post-processing apparatus 80 connected to the glosser 70, and a low temperature fixing post-processing apparatus 90 connected to the normal fixing post-processing apparatus 80. However, the configuration of the post-processing device 65 is not limited to the example. Various publicly known configurations may be used. The ON and OFF of the glosser 70 is controlled with the DFE 30. When being turned ON, the glosser 70 re-fixes the image formed on the recording medium with the printer machine 50. This uniformly compresses the total amount of the attached toner in each pixel to which a predetermined amount or more of toner is attached in the whole image formed on the recording medium.

A clear toner is installed on the normal fixing post-processing apparatus 80 and the low temperature fixing post-processing apparatus 90 as standard. The user can perform a printing process in each spot color by replacing the clear toner cartridge with another spot color toner cartridge such as white, gold, or silver. Note that, although the configuration on which the clear toner is installed will be described below, the configuration has the same functions and various conventional techniques can be used if another spot color toner is installed.

A clear toner and the fixing machine for fixing the clear toner are installed on the normal fixing post-processing apparatus 80. The image data of the clear toner plate generated with the DFE 30 (the image data for forming the toner image in accordance with the clear toner) is input to the normal fixing post-processing apparatus 80. The normal fixing post-processing apparatus 80 superimposes the toner image of the clear toner on the image pressurized with the glosser 70 and formed on the recording medium, using the input image data of the clear toner plate. Subsequently, the toner image formed on the recording medium is heated and pressurized at a normal temperature in the fixing machine and then is fixed on the recording medium.

A clear toner and the fixing machine for fixing the clear toner are installed on the low temperature fixing post-processing apparatus 90. The image data of the clear toner plate generated with the DFE 30 is input to the low temperature fixing post-processing apparatus 90. The low temperature fixing post-processing apparatus 90 superimposes the toner image of the clear toner on the image formed on the recording medium pressurized with the glosser 70 and the normal fixing post-processing apparatus 80, using the input image data of the clear toner plate. Subsequently, the toner image formed on the recording medium is heated and pressurized at a temperature lower than the normal temperature (at a low temperature) in the fixing machine and then is fixed on the recording medium.

Next, the functional configuration of the host device 10 will be described.

Figure 2:
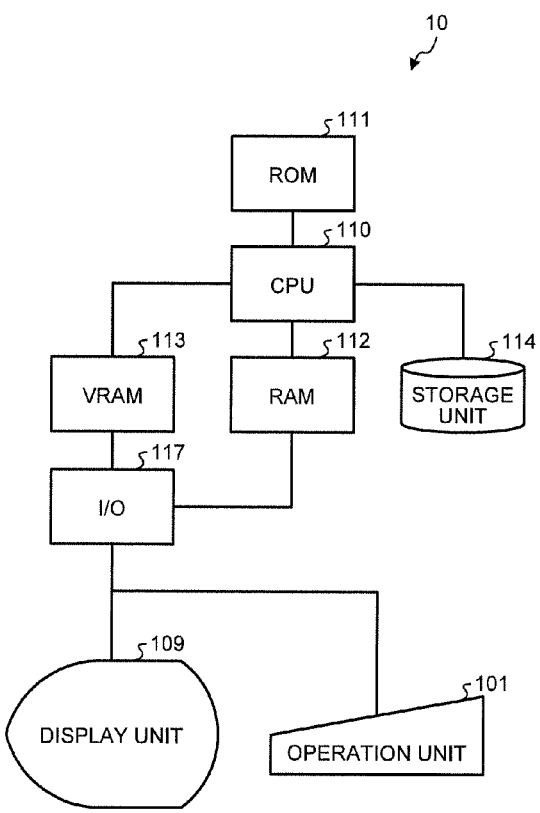
FIG. 2 is a view of the hardware configuration of a host device.

FIG. 2 is a view of the hardware configuration of the host device 10. As illustrated in FIG. 2, the host device 10 includes a Central Processing Unit (CPU) 110, a memory including a ROM 111, a RAM 112, and a VRAM 113, a storage unit 114 such as an HDD, a display unit 109 such as a display, an operation unit 101 such as a keyboard or a mouse, and an input and output interface I/O 117. The host device 10 has a hardware configuration using a normal computer.

The display unit 109 is a device for displaying various screens and images. The display unit 109 includes, for example, a liquid crystal display device. The operation unit 101 is an input device used to input various instructions and settings by the user. The operation unit 101 includes, for example, a keyboard or a mouse.

The storage unit 114 is a device for recording various types of data. The storage unit 114 includes a storage medium such as a hard disk drive (HDD) device or a flash memory. The storage unit 114 stores various control programs including an application program for editing a spot color object (hereinafter, referred to as a spot color object editing application 11). The storage unit 114 further stores an image file to be processed with the spot color object editing application 11.

The image file may be in any specific file format. However, an example in which file data in PDF is processed will be described hereinafter. Additionally, a file format such as a file for editing a document, a file for referring to a document, or a file for drawing a diagram may be to be processed with the spot color object editing application 11. The file format to be processed is not limited especially.

The spot color object editing application 11 is provided after being recorded in a installable or executable format in a computer readable recording medium such as a CD-ROM, a flexible disk (FD), a CD-R, or a Digital Versatile Disk (DVD). Alternatively, the spot color object editing application 11 may be provided after being stored in a computer connected to a network such as the Internet and being downloaded through the network. Alternatively, the spot color object editing application 11 may be provided or distributed through a network such as the Internet. Alternatively, the spot color object editing application 11 may be provided while being embedded, for example, in a ROM.

Figure 3:
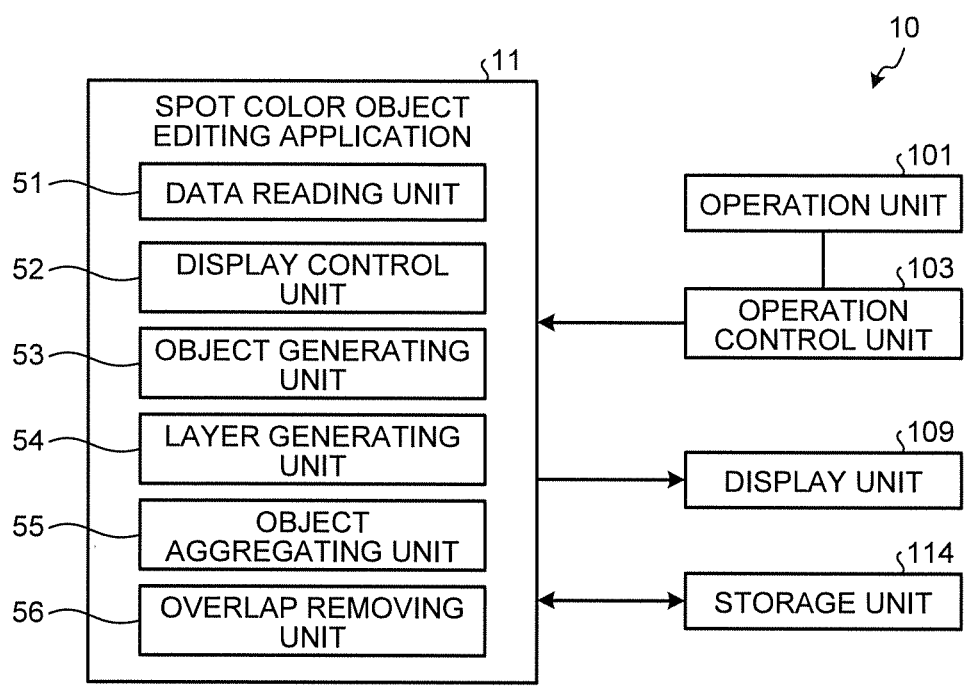
FIG. 3 is a block diagram of an exemplary functional configuration of a spot color object editing application.

FIG. 3 is a block diagram of an exemplary functional configuration of the spot color object editing application 11. As illustrated in FIG. 3, the spot color object editing application 11 has a module configuration including a data reading unit 51, a display control unit 52, an object generating unit 53, a layer generating unit 54, an object aggregating unit 55, and an overlap removing unit 56. As actual hardware, the CPU 110 (processor) executes the spot color object editing application 11 after reading the spot color object editing application 11 from the recording medium. This loads each of the components on the main storage device and thus generates the data reading unit 51, the display control unit 52, the object generating unit 53, the layer generating unit 54, the object aggregating unit 55, and the overlap removing unit 56 on the main storage device.

Note that all of the components are not necessarily implemented with software. Some of the components may be implemented with hardware.

The data reading unit 51 reads the file data to be processed from the storage unit 114 and then decompresses the read file data in the RAM 112. Note that the memory area used for the decompression is not limited to the RAM 112. Another storage device may be used.

The display control unit 52 generates the screen data to be displayed on the display unit 109, and controls the displaying process in the display unit 109.

Figure 4:
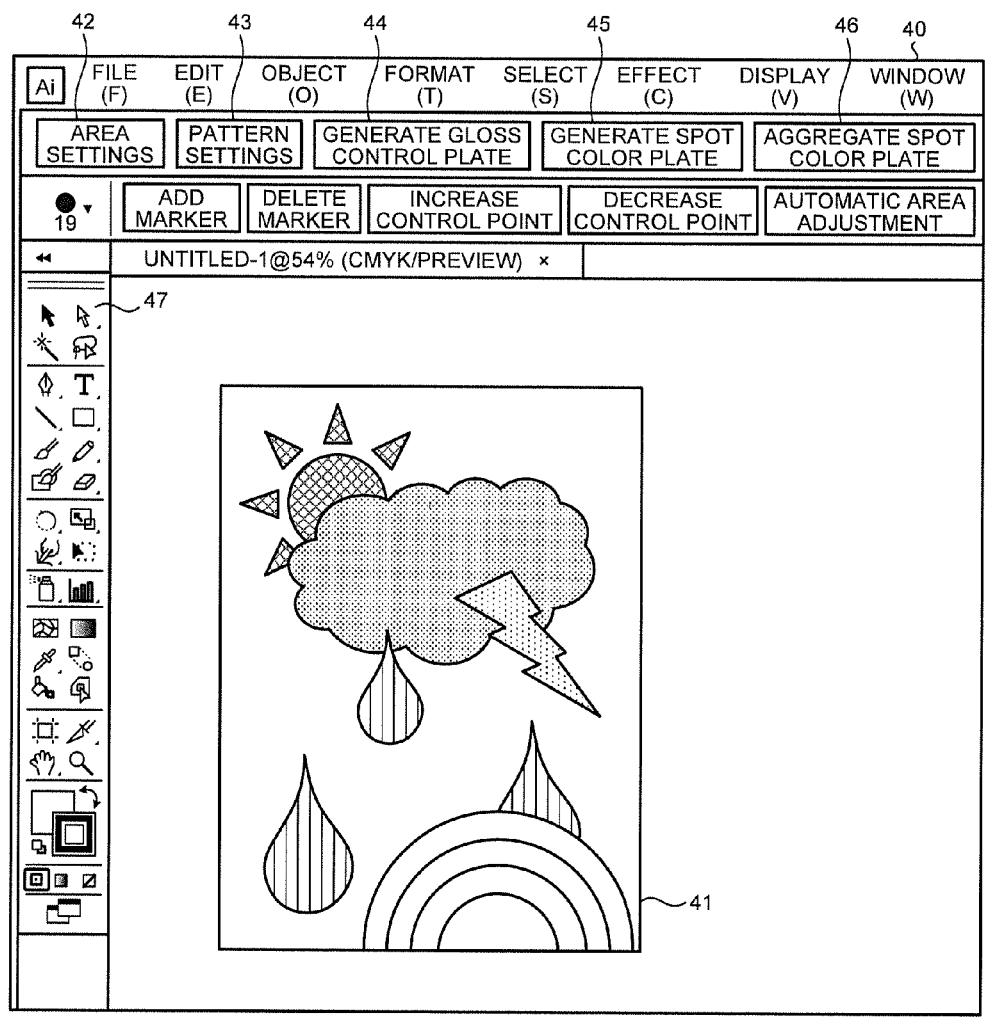
FIG. 4 is a view of an exemplary editing screen for editing spot color objects.

FIG. 4 is a view of an example of the editing screen 40 for editing a spot color object. The display control unit 52 displays an image 41 to be processed with the spot color object editing process on the editing screen 40 based on the data included in the image file read with the data reading unit 51. Note that, when the image file read in the editing screen 40 includes a plurality of pages, the image 41 may be edited page by page with a page turning function.

As illustrated in FIG. 4, the editing screen 40 includes an area setting button 42, a pattern setting button 43, a gloss control plate generating button 44, a spot color plate generating button 45, and a spot color plate aggregating button 46. The area setting button 42 is used to set an image area on which a spot color printing is performed (spot color image area). The pattern setting button 43 is used to set a type of mesh patterns or gloss patterns. The gloss control plate generating button 44 is used to generate an image area of which gloss is controlled with a clear toner. The spot color plate generating button 45 is used to generate an image area on which a spot color printing is performed in a spot color other than the clear color. The spot color plate aggregating button 46 is used to aggregate the generated spot color image areas in accordance with each type of the spot colors and generate a spot color plate. Additionally, various drawing tools 47, which are used to draw or edit a spot color image area, are selectively displayed on the editing screen 40. The tools commonly used in software for drawing may be used as the drawing tools 47. Thus, the description of the drawing tools 47 is omitted herein.

With reference to FIG. 3 again, the object generating unit 53 generates an object to be printed with each color toner or a spot color object to be printed with a clear toner or another spot color based on the information input from the editing screen 40 through the operation unit 101 and the operation control unit 103. The object generating unit 53 stores the drawing information (for example, the color information, the positional information, or the concentration information) about the generated spot color object in the storage unit 114.

The layer generating unit 54 generates spot color layers on which the spot color objects are to be aggregated and placed in accordance with each type of the spot color objects. The layer generating unit 54 generates a layer on which the objects in colors other than the spot colors are to be aggregated and placed.

The object aggregating unit 55 aggregates the spot color objects in accordance with each type of the spot color objects and places the aggregated spot color objects on each spot color layer corresponding to the type. The object aggregating unit 55 further aggregates the objects in colors other than the spot colors on a layer.

The data formation of each object included in the image 41 in FIG. 4 and the classification of the types of the objects will be described hereinafter with reference to FIG. 5.

Figure 5:
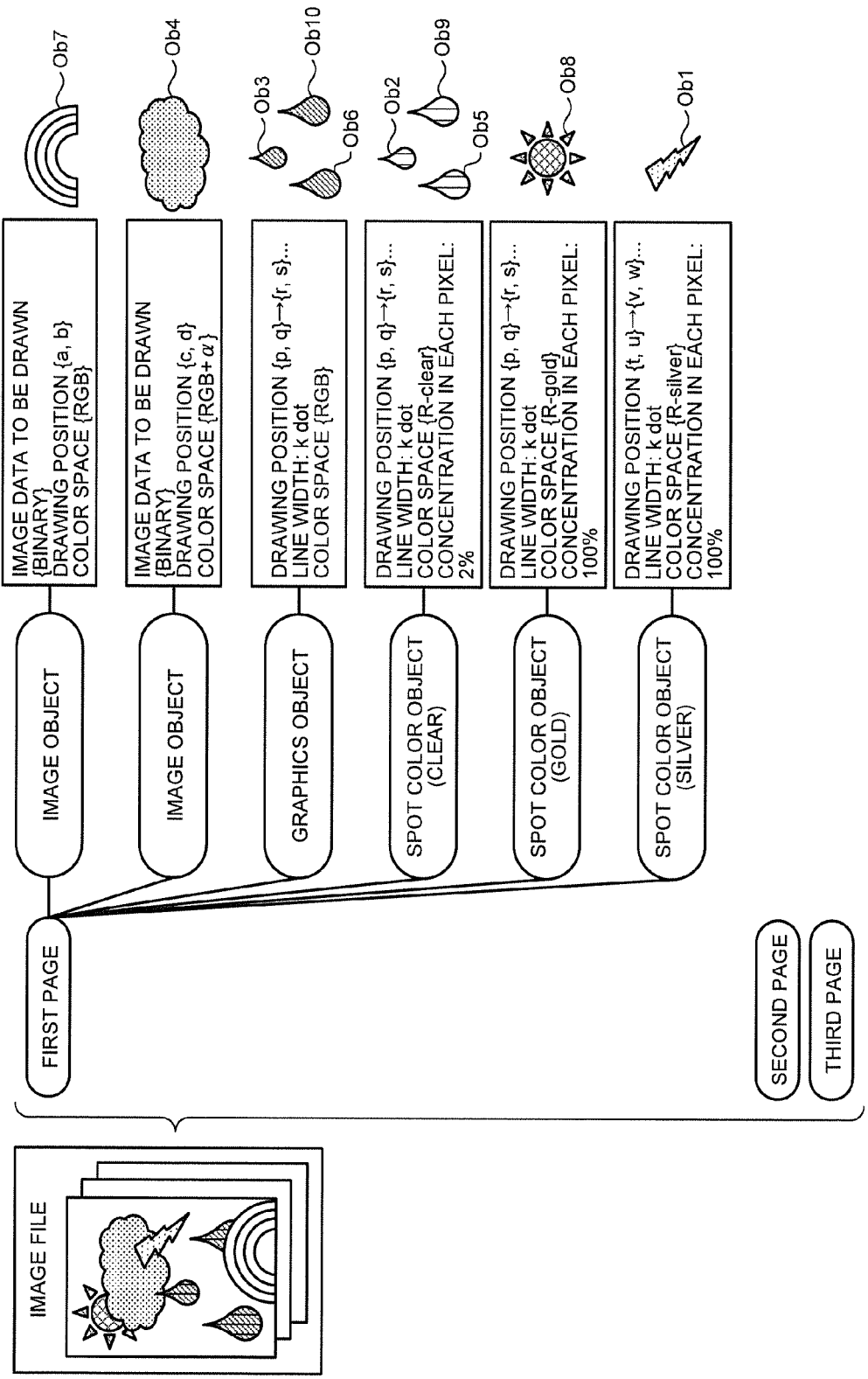
FIG. 5 is an explanatory view of the data formation of objects included in an image.

FIG. 5 is an explanatory view of the data formation of the objects included in the image 41. The objects included in the first page of the image file can be classified into three types of spot color objects and the objects other than the spot color objects.

In other words, an object Ob7, which is an image object illustrating the object expressed with binary data, includes the color information indicated with a color space in RGB as the drawing information. An object Ob4, which is also an image object, includes, as the drawing information, the drawing position and the color information indicated with a color space of RGB. Objects Ob3, Ob6, and Ob10, which are graphics objects illustrating the objects expressed with vector data, include the position at which a straight line is to be drawn, the width of a line, and the color information indicated with a color space in RGB as the drawing information.

The object aggregating unit 55 determines the objects Ob7 and Ob4 in different colors as different types of objects from each other, and determines the objects Ob3, Ob6, and Ob10 which are the graphics objects in the same color as the same types of objects.

The drawing information about spot color objects Ob2, Ob5, and Ob9 includes the color information designating the printing with a clear toner (R-clear), and the concentration information designating the concentration of 2% in each pixel. The drawing information about a spot color object Ob8 includes the color information designating the printing with a gold toner (R-gold), and the concentration information designating the concentration of 100% in each pixel. The drawing information about the spot color object Ob1 includes the color information designating the printing with a silver toner (R-silver), and the concentration information designating the concentration of 100% in each pixel.

The object aggregating unit 55 classifies the spot color objects based on the color information and concentration information about the spot colors, or the information about the surface effect such as the glossy effect, pattern printing, or smoothing. In the example of FIG. 5, the object aggregating unit 55 determines the spot color objects Ob2, Ob5, and Ob9 including the color information of the R-clear as the same types of spot color objects. The object aggregating unit 55 also determines the spot color object Ob8 including the color information of the R-gold, and the spot color object Ob1 including the color information of the R-silver as different types of spot color objects from each other.

Note that the types of the objects and the criteria of classification illustrated in FIG. 5 are examples. The types may be classified with another parameter. The method for classifying the types is not especially limited. The example in which the objects are classified in accordance with the color is described. However, the objects may be classified in accordance with the concentration, the surface effect, or the printing process. In the embodiment, the object aggregating unit 55 automatically classifies the types. However, a reception unit used to group the objects may be provided such that the objects are grouped based on the user's designation and the group may be determined as a type.

Figure 6:
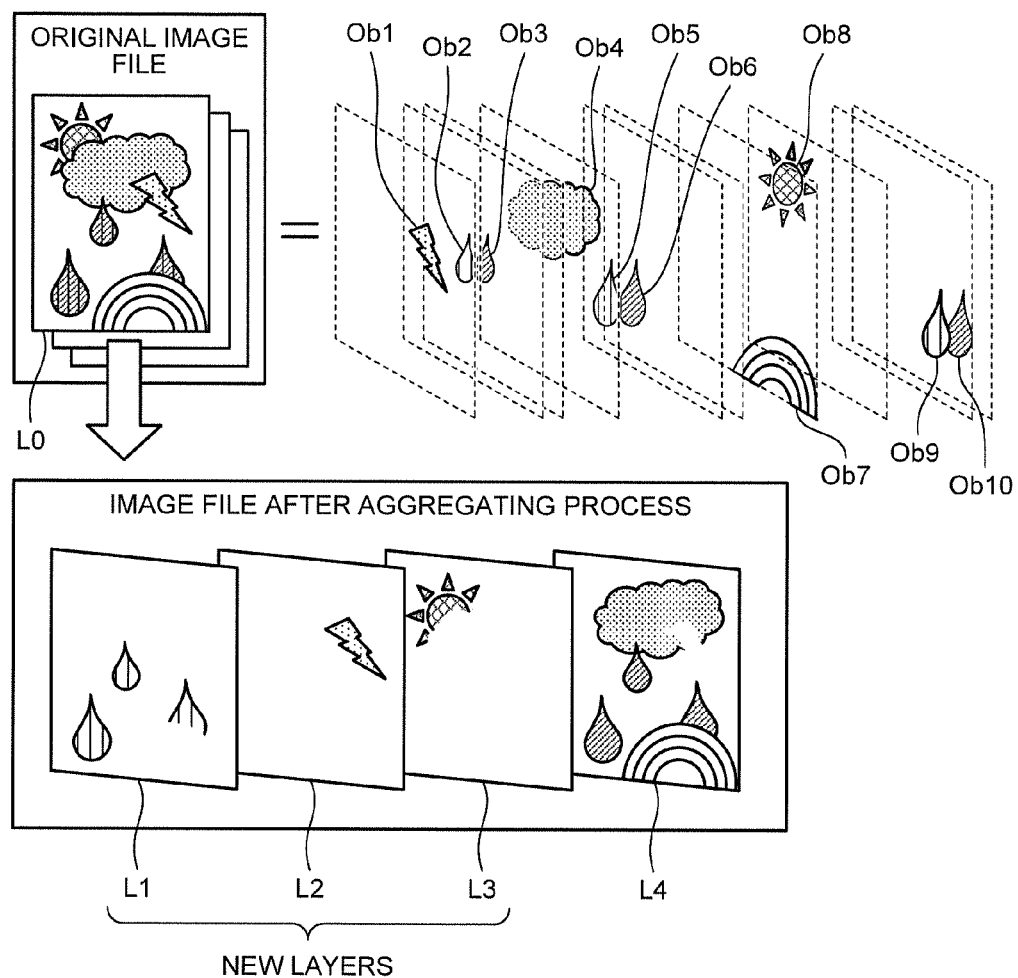
FIG. 6 is a schematic explanatory view of a process for aggregating objects and relocating the objects to new layers.

FIG. 6 is a schematic explanatory view of a process for aggregating the objects and relocating the objects on new layers. Table 1 illustrates the order of arrangement of the objects before the process for aggregating the objects illustrated in FIG. 6. Table 2 illustrates the new layers on which the spot color objects are aggregated and the order of arrangement of the new layers.

TABLE 1

| LAYER | ORDER OF ARRANGEMENT | OBJECT | OBJECT TYPE |
|---|---|---|---|
| L0 | 1 (FOREFRONT SURFACE) | BOLT OF LIGHTING | SPOT COLOR OBJECT (SILVER) |
|  | 2 | DROPLET A-1 | SPOT COLOR OBJECT (CLEAR) |
|  | 3 | DROPLET A-2 | IMAGE OBJECT |
|  | 4 | CLOUD | IMAGE OBJECT |
|  | 5 | DROPLET B-1 | SPOT COLOR OBJECT (CLEAR) |
|  | 6 | DROPLET B-2 | IMAGE OBJECT |
|  | 7 | RAINBOW | IMAGE OBJECT |
|  | 8 | SUN | SPOT COLOR OBJECT (GOLD) |
|  | 9 | DROPLET C-1 | SPOT COLOR OBJECT (CLEAR) |
|  | 10 (BACKMOST SURFACE) | DROPLET C-2 | IMAGE OBJECT |

TABLE 2

| LAYER | ORDER OF ARRANGEMENT | OBJECT | OBJECT TYPE |
|---|---|---|---|
| L1 | 1 | DROPLET A-1 | SPOT COLOR OBJECT (CLEAR) |
|  | 2 | DROPLET B-1 | SPOT COLOR OBJECT (CLEAR) |
|  | 3 | DROPLET C-1 | SPOT COLOR OBJECT (CLEAR) |
| L2 | 1 | BOLT OF LIGHTING | SPOT COLOR OBJECT (SILVER) |
| L3 | 1 | SUN | SPOT COLOR OBJECT (GOLD) |
| L4 | 1 | DROPLET A-2 | IMAGE OBJECT |
|  | 2 | CLOUD | IMAGE OBJECT |
|  | 3 | DROPLET B-2 | IMAGE OBJECT |
|  | 4 | RAINBOW | IMAGE OBJECT |
|  | 5 | DROPLET C-2 | IMAGE OBJECT |

As illustrated in Table 1 and FIG. 6, the objects (including the spot color objects) are stacked and displayed on a layer L0 of the original image file in the preferential order for the display from the side of the front surface (near side) to the side of the back surface (far side). In other words, the spot color object Ob1, the spot color object Ob2, the object Ob3, the object Ob4, the spot color object Ob5, the object Ob6, the object Ob7, the spot color object Ob8, the spot color object Ob9, and the object Ob10 are stacked and arranged sequentially from the side of the front surface in the example in FIG. 6.

As illustrated in FIG. 5, the object aggregating unit 55 groups (aggregates) the spot color objects Ob2, Ob5, and Ob9 that are the same type and include the "R-clear" as the color information. As illustrated in FIG. 6, the layer generating unit 54 newly generates a spot color layer L1 for the group such that the object aggregating unit 55 places the grouped spot color objects Ob2, Ob5, and Ob9 on the spot color layer L1. This aggregates and places only the clear spot color objects on the spot color layer L1 as illustrated in Table 2.

The layer generating unit 54 newly generates a spot color layer L2 as illustrated in FIG. 6 so as to place the spot color object Ob1 including the "R-silver" as the color information (see FIG. 5) on the spot color layer L2. The object aggregating unit 55 places the spot color object Ob1 on the spot color layer L2. This places only the silver spot color object on the spot color layer L2 as illustrated in Table 2.

Additionally, the layer generating unit 54 newly generates a spot color layer L3 as illustrated in FIG. 6 so as to place the spot color object Ob8 including the "R-gold" as the color information (see FIG. 5) on the spot color layer L3. The object aggregating unit 55 places the spot color object Ob8 on the spot color layer L3. This places only the gold spot color object on the spot color layer L3 as illustrated in Table 2.

The layer generating unit 54 generates a layer L4 as illustrated in FIG. 6 so as to collect and place the objects in colors other than the spot colors, namely, the objects of which color information is designated with RGB or CMYK on the layer L4. The object aggregating unit 55 aggregates and places the objects Ob3, Ob4, Ob6, Ob7, and Ob10 on the layer L4. Note that the image data may be stored on the original layer L0 by leaving the objects on the layer L0 without newly generating the layer L4 for the objects in colors other than the spot colors.

Note that the pieces of drawing information about the spot color objects aggregated on the same layer may collectively be edited (an collectively editing unit). In other words, for example, the color information, concentration information, and spot color print settings such as the surface effect about the spot color objects Ob2, Ob5, and Ob9 aggregated on the spot color layer L0 in FIG. 6 may collectively be edited. This can efficiently configure the print settings of the spot color objects, and thus can improve the convenience of editing the spot color objects.

The settings can be configured for switching whether or not the original image file before the aggregation of the objects is stored when the image file is stored after the aggregating process. For example, a first setting is configured to store both of the original image file before the aggregation (the image file including the layer L0 in the example in FIG. 6), and the image file after the aggregation (the image file including the layers L1 to L4 in the example in FIG. 6). A second setting is configured to store the image file after the aggregation by replacing the original image file before the aggregation with the image file after the aggregation. In other words, the original image file before the aggregation is not stored in the second setting. Then, the switch between the first setting and the second setting may be received with a setting item of a method for storing a file in the menu on the editing screen 40 (see FIG. 4) (a reception unit).

As illustrated in Table 2 and FIG. 6, the layer generating unit 54 places the spot color layers L1 to L3 in front of the layer L4 on which the objects in colors other than the spot colors are aggregated and placed. In the configuration illustrated in FIG. 1, the printer machine 50 performs printing in CMYK colors and then the post-processing device 65 performs spot color printing. Thus, in the present embodiment, the layers may be placed in the order in accordance with the order in the print process in which the printing in CMYK colors is performed previously, and then the spot colors are superimposed and printed on the previously printed surface.

When the spot color toners in a plurality of colors are used, the printing in CMYK colors are previously performed, and then a plurality of spot colors are sequentially superimposed and printed while the cartridges of the spot color toners are exchanged, normally. Thus, placing the spot color layers in front can arrange the layers in the order in accordance with the printing procedures.

In that case, placing the spot color layers in front may cause the drawing area of the spot color object that has originally hidden at the back, to be in front and this changes the drawn image. In light of the foregoing, the present embodiment removes the overlap such that the image drawn with the objects does not change even if the arrangement order (preferential order for display) changes.

Note that it is determined depending on the configuration of the image forming apparatus which colors to print previously, the CMYK colors or the spot colors. The spot color layers are sometimes provided in front as in the present embodiment. Alternatively, the layers are sometimes arranged in the order opposite to the order in the present embodiment. Thus, the overlap removing process is performed not only for removing the overlap in the spot color object. The overlap removing process may be performed in accordance with the order of arrangement of the objects.

If there is an overlapping area in which the drawing area of a spot color object overlaps with the drawing area of the other object, the overlap removing unit 56 (see FIG. 3) performs an overlap removing process for removing the overlapping area from the drawing area of the spot color object. In other words, if the drawing area of the other object (a spot color object or an object in a color other than the spot colors) is superimposed in front of the spot color object, the overlap removing unit 56 removes the overlapping drawing area (referred to as an overlapping area) from the spot color object at the back. Then, the spot color object from which the overlapping area has been removed is placed on the spot color layer provided for each type.

The overlapping area is removed as described above if the spot color object is placed in front as described above. This can readily remove the drawing area that has been hidden when the spot color object has been placed at the back. In other words, when the order of the arrangement is changed, the drawn image is maintained the same as the drawn image before the change of the order without the user's adjustment of the shape of the object. This can simplify the process for editing the spot color objects.

FIG. 7 is a schematic view briefly describing a process for generating an object by removing an overlapping area. In the example illustrated at (1) in FIG. 7, at least a part of the drawing area of a spot color object 72 hidden at the back is hidden under an object 71 placed in front. The overlap removing unit 56 cut an overlapping area 73 hidden under the object 71 in the spot color object 72 from the spot color object 72 so as to determine an image area that does not include the overlapping area 73 as a new spot color object 74. Then, the overlap removing unit 56 stores the spot color object 74 by replacing the original spot color object 72 with the spot color object 74.

Note that, even if there is an overlapping area 77 of the objects as illustrated at (2) in FIG. 7, the drawing area of a spot color object 76 can be seen through if an object 75 placed in front is a clear spot color object. Consequently, there is no problem if the arrangement of the objects is changed and thus the spot color object 76 is placed at the back. In that case, the overlap removing unit 56 maintains the original shape of the spot color object 76 without cutting the overlapping area 77.

Figure 8:
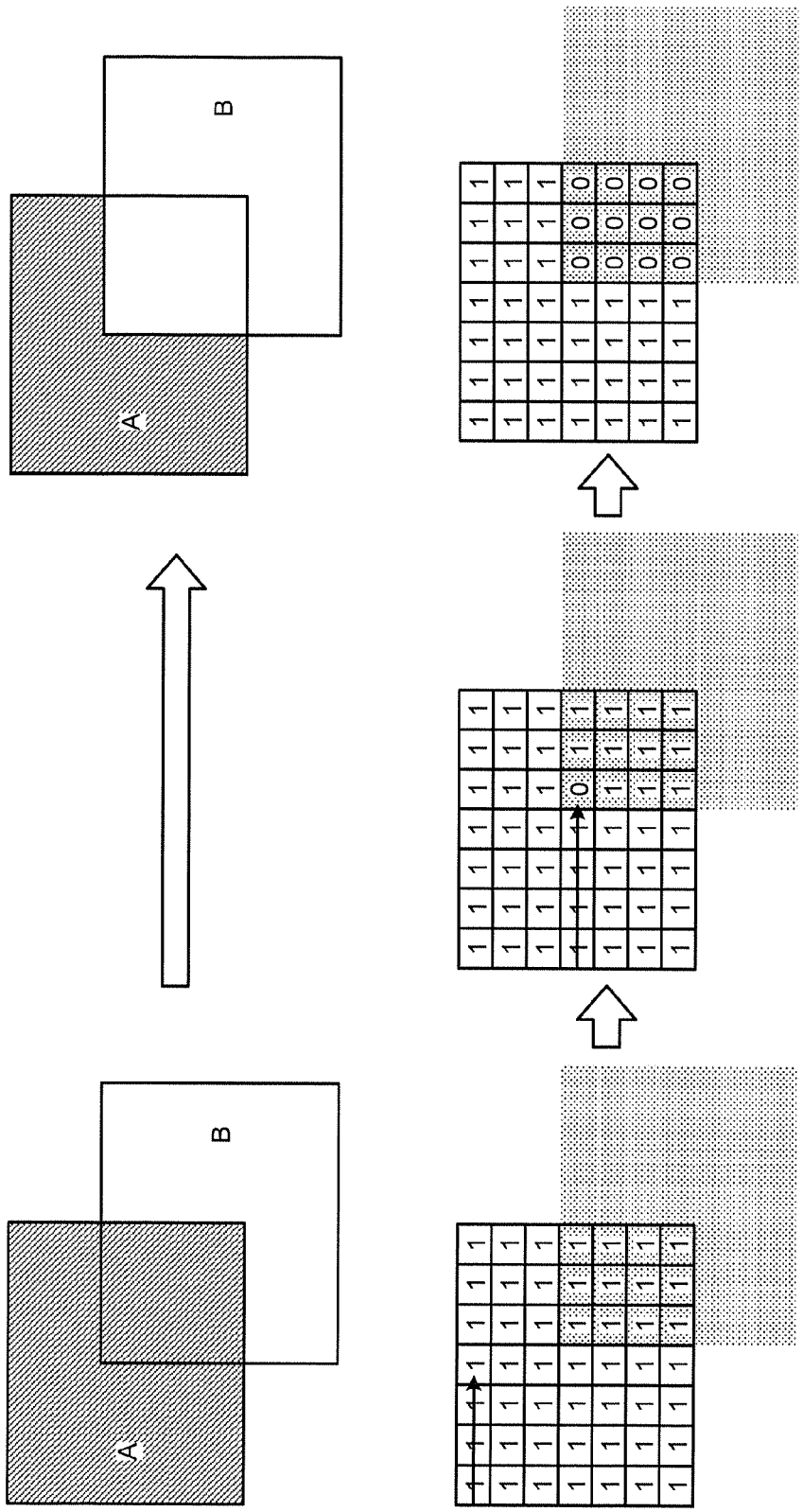
FIG. 8 is an explanatory view of a concrete example of a process for cutting an overlapping area.

FIG. 8 is an explanatory view of a concrete example of a process for cutting an overlapping area. In the example of FIG. 8, the drawing area that is a part of a spot color object A overlaps with the drawing area that is a part of an object B. The overlap removing unit 56 removes the overlapping area, for example, with a bit operation. In other words, the overlap removing unit 56 checks the information about the coordinates in the drawing area of the spot color object A sequentially to determine whether the drawing area of the spot color object A overlaps with the drawing area of the object B.

An example in which the pixels that correspond to the drawing area of each object are denoted with bit values: 1, and the pixels that does not correspond to the drawing area are denoted with bit values: 0 will be described. If the bit value of the spot color object A is 1 and the bit value of the object B is 0 on a pixel having coordinates (x and Y), the spot color object A does not overlap with the object B. If the bit value of the spot color object A is 1 and the bit value of the object B is 1, the spot color object A overlaps with the object B on the pixel having the coordinates (x and Y). If the spot color object A overlaps with the object B on coordinates, the overlap removing unit 56 removes the coordinates from the drawing area by changing the bit value of the pixel of the spot color object A on the coordinates into zero.

Figure 9:
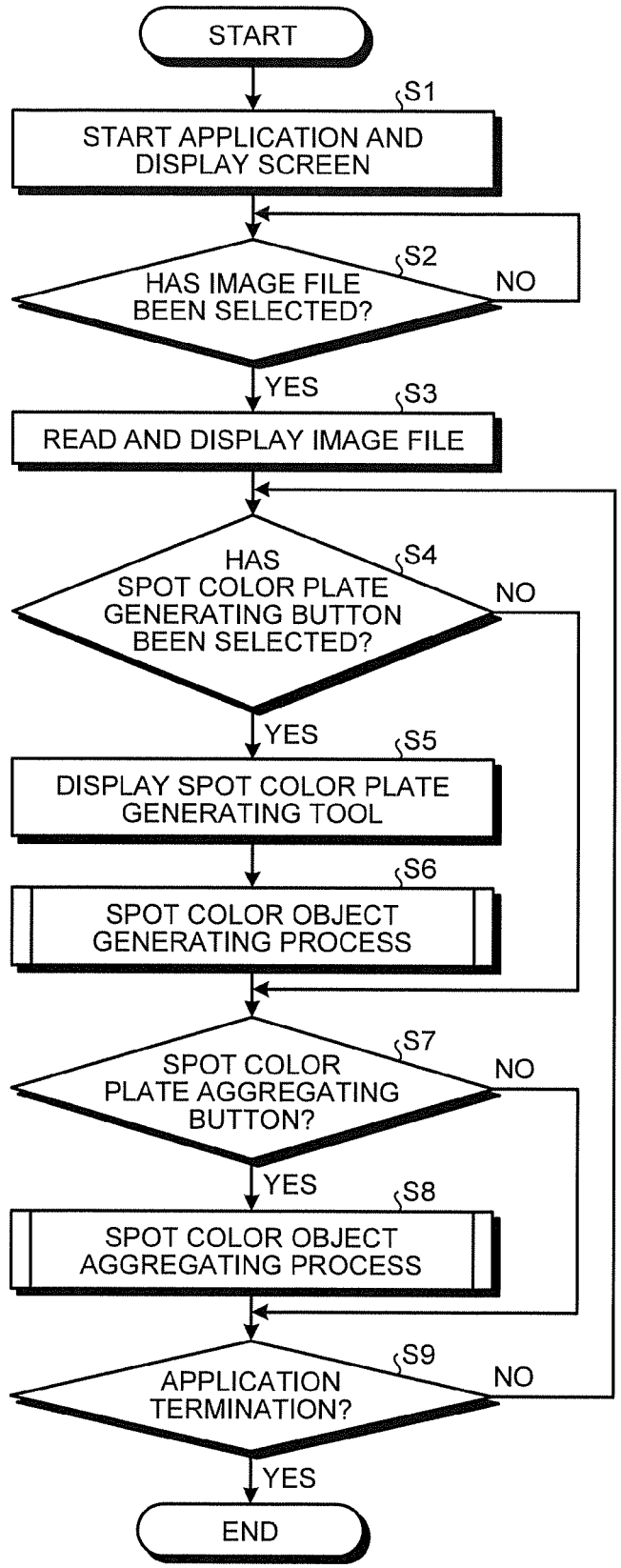
FIG. 9 is a flowchart describing exemplary procedures in a spot color object editing process performed with the host device.

Next, exemplary procedures in a process for editing a spot color object will be described with reference to FIG. 9. FIG. 9 is a flowchart of exemplary procedures in the spot color object editing process performed with the host device 10.

First, when the operation control unit 103 receives an operation for instructing the start of the spot color object editing application 11, the display control unit 52 starts the application and displays the editing screen 40 (see FIG. 4) on the display unit 109 (step S1).

Next, when the operation control unit 103 receives an operation for selecting an image file to be edited, such as a PDF file, through the operation unit 101 (step S2: Yes), the display control unit 52 reads the image file from the storage unit 114 to output and display the image file on the display unit 109 (step S3). While the operation control unit 103 does not receive an operation for selecting an image file (step S2: No), the operation control unit 103 waits for an operation.

Next, when the operation control unit 103 receives an operation for selecting the spot color plate generating button 45 (see FIG. 4) (step S4: Yes), the display control unit 52 displays a spot color plate generating tool for generating and editing the spot color object on the displayed screen (step S5) to perform the process for generating a spot color object (step S6). When the operation control unit 103 does not receive an operation for selecting the spot color plate generating button (step S4: No), the process goes to step S7.

An existing technique may be used for the spot color object generating process performed in step S6. For example, the object generating unit 53 performs the process for generating a spot color object based on the input from the operation unit 101. For example, the object generating unit 53 receives the designation of the position at which the spot color object is to be placed based on the position of a pointer displayed on the screen. Additionally, the object generating unit 53 generates the drawing information about the spot color object, for example, based on the operation of a drawing tool for drawing each diagram or the designation of the position by the pointer. The object generating unit 53 further generates, for example, the color information or concentration information about the spot color object based on an operation to a color combination tool for editing the color combination of each diagram. Then, the object generating unit 53 determines the generated information as the drawing information about the spot color object and puts an identifier for identifying the object to the information and records the information in the storage unit 114. Additionally, the object generating unit 53 puts serial layer numbers on the spot color objects, and displays the layer on which the newly generated spot color object is placed on the forefront of the image.

A spot color plate aggregating button for a process for aggregating the spot color objects in accordance with each spot color is displayed on the displayed screen. When the operation control unit 103 receives an operation for selecting the spot color plate aggregating button through the operation unit 101 (step S7: Yes), the object aggregating unit 55 starts the spot color object aggregating process (step S8). The procedures of the process will be described below with reference to FIG. 10.

Note that, although the instruction for the start of the spot color object aggregating process is received upon the selection of the spot color plate aggregating button in that case, the time to start the aggregating process is not limited to the case. The spot color object aggregating process may be started, for example, when an instruction for printing, or an instruction for storing an image file is received.

On the other hand, when the operation control unit 103 does not receive an operation for selecting the spot color plate aggregating button (step S7: No), the operation control unit 103 determines whether the operation control unit 103 has received an instruction to terminate the application (step S9). When the operation control unit 103 has not received an instruction to terminate the application (step S9: No), the process goes back to step S4. When the operation control unit 103 has received an instruction to terminate the application (step S9: Yes), the operation control unit 103 terminates the application.

Figure 10:
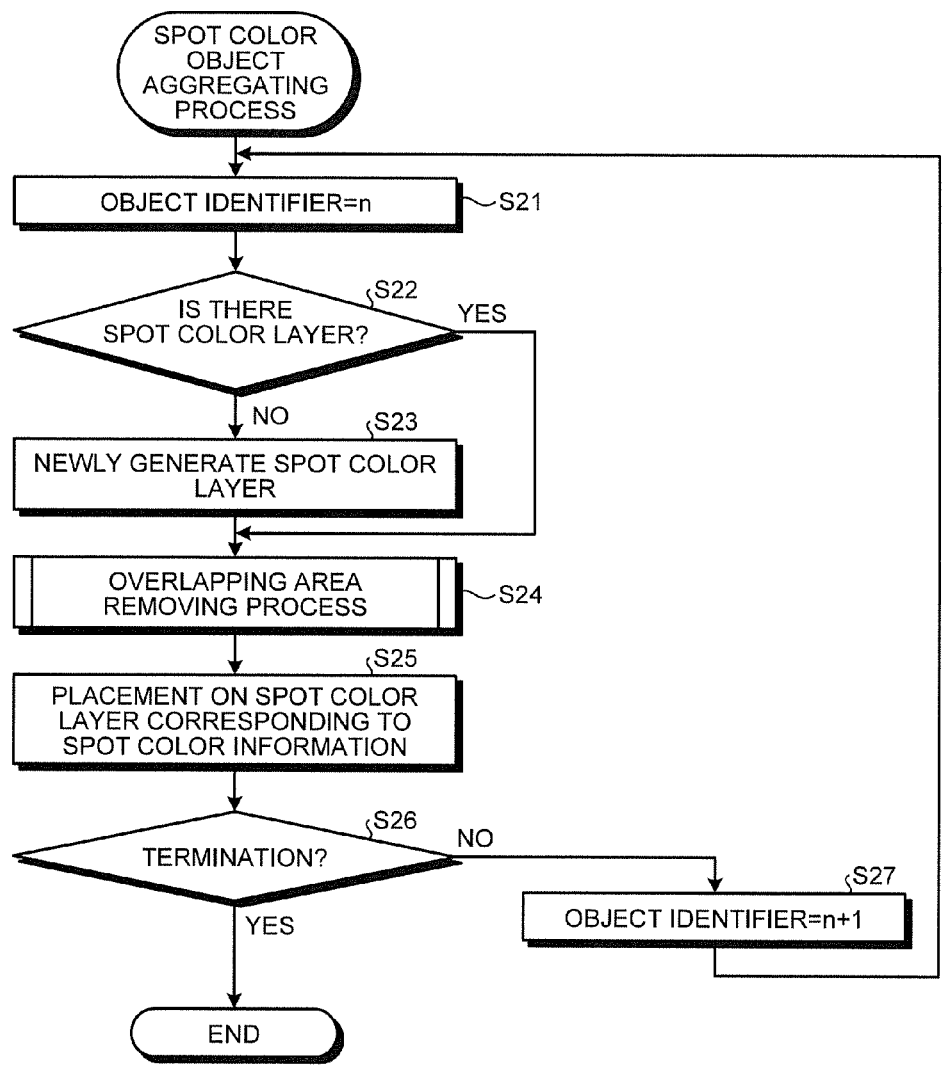
FIG. 10 is a flowchart describing exemplary procedures in a spot color object aggregating process.

Next, exemplary procedures in the spot color object aggregating process will be described with reference to FIG. 10. FIG. 10 is a flowchart of exemplary procedures in the spot color object aggregating process performed with the host device 10.

First, the object aggregating unit 55 selects a spot color object of which identifier is n as the object to be processed (step S21). Then, the layer generating unit 54 determines, with reference to the color information in the drawing information about the spot color object, whether a spot color layer corresponding to the color information has been generated (step S22).

Note that, although the layer generating unit 54 refers only to the color information when a spot color layer is provided for each spot color, the layer generating unit 54 determines whether a spot color layer corresponding to the type has been generated with reference to the type of the object based on the drawing information when the object is classified in consideration of the other pieces of drawing information including the concentration information, or the surface effect information (step S22).

When a spot color layer corresponding to the color information has been generated (step S22: Yes), the process goes to step S24. When a spot color layer corresponding to the color information has not been generated (step S22: No), the layer generating unit 54 newly generates the spot color layer in accordance with the spot color (the color information) and records the color information of the spot color object as the color information about the spot color layer (step S23).

Next, a process for removing an overlapping area is performed in step S24 in order to eliminate the overlap on the object to be processed. The overlapping area removing process will be described below with reference to FIG. 11.

The object aggregating unit 55 places the spot color object processed with the overlapping area removing process on the spot color layer corresponding to the type of the object (step S25).

Then, the object aggregating unit 55 determines whether all of the spot color objects have been processed with the processes in step S21 to S25 (step S26). When all of the processes have not been completed (step S26: No), the object aggregating unit 55 determines the next spot color object of which identifier is n+1 as the object to be processed (step S27) to process all of the spot color objects with the processes in step S21 to S25.

Figure 11:
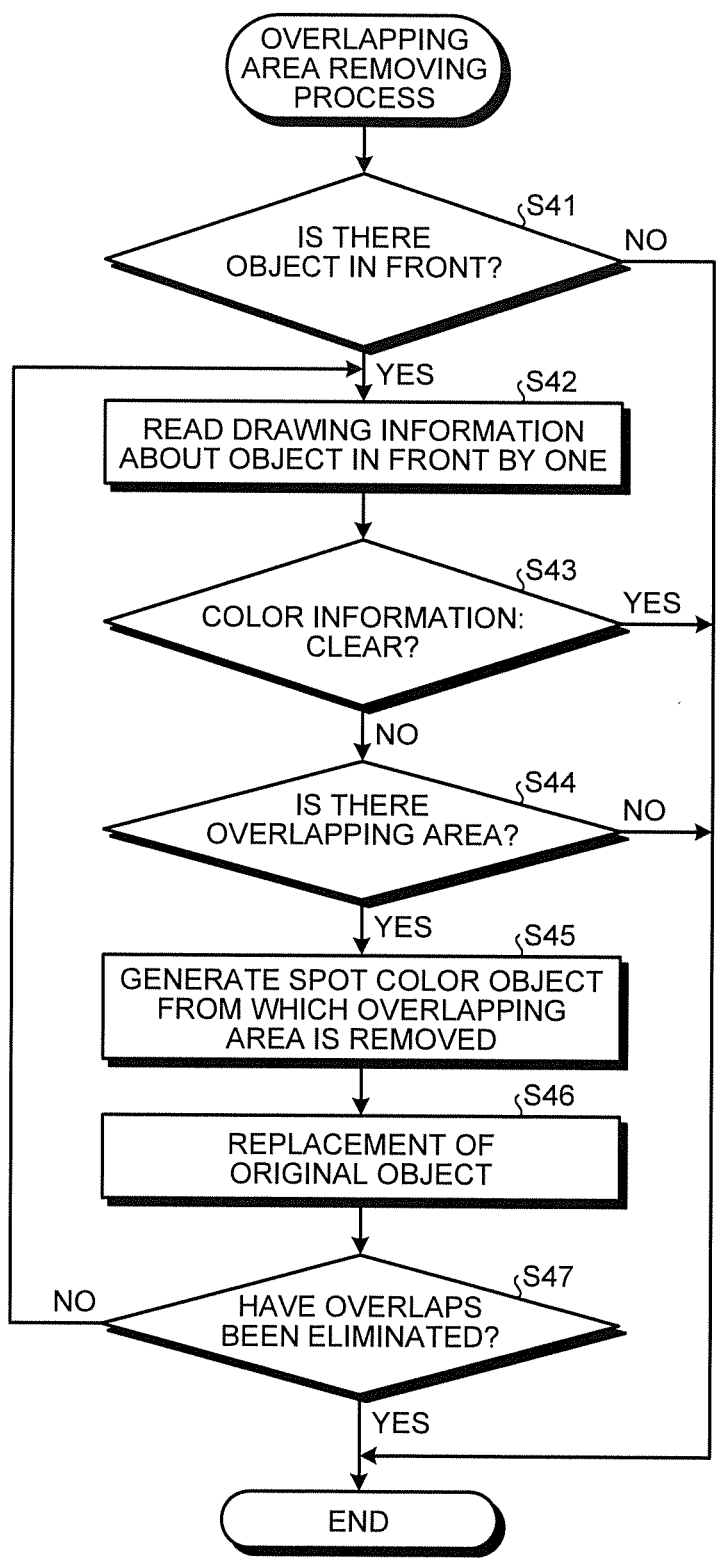
FIG. 11 is a flowchart describing exemplary procedures in an overlapping area removing process.

Next, the overlapping area removing process performed in step S24 will be described in FIG. 11. FIG. 11 is a flowchart of exemplary procedures in the overlapping area removing process.

The overlap removing unit 56 determines whether a spot color object is placed in front of the spot color object of which identifier is n and that is to be processed (the object to be processed) (step S41). When there is no spot color object in front of the object to be processed (step S41: No), the overlap removing unit 56 terminates the process. When there is a spot color object in front of the object to be processed (step S41: Yes), the overlap removing unit 56 reads the drawing information about the spot color object placed in front of the object to be processed by one from the storage unit 114 (step S42).

The overlap removing unit 56 determines whether a clear color is designated in the color information about the spot color object one object before the object to be processed (step S43). When a clear color is designated as the spot color (step S43: Yes), the overlap removing unit 56 terminates the process. When a spot color other than a clear color is designated (step S43: No), the process goes to step S44.

Subsequently, the overlap removing unit 56 determines whether there is an overlapping area in which the drawing area of the spot color object placed in front of the object to be processed overlaps with the drawing area of the object to be processed by comparing the pieces of drawing information about both of the objects (step S44). When there is no overlapping area (step S44: No), the overlap removing unit 56 terminates the process. When there is an overlapping area (step S44: Yes), the overlap removing unit 56 removes the overlapping area by rewriting the information bit by bit as described above, and generates a spot color object from which the overlapping area is removed (step S45).

Subsequently, the overlap removing unit 56 replaces the original spot color object with the spot color object from which the overlapping area is removed, and stores the spot color object from which the overlapping area is removed in the storage unit 114 (step S46). In other words, the overlap removing unit 56 deletes the drawing data of the original spot color object, and stores the generated spot color object in the storage unit 114, using the positional information about the original spot color object.

The overlap removing unit 56 determines whether all of the overlaps of the object to be processed and all of the spot color objects in front of the object to be processed are eliminated (step S47). When all of the overlaps are eliminated (step S47: Yes), the overlap removing unit 56 terminates the process. When a spot color object including an overlap remains in front of the object to be processed (step S47: No), the overlap removing unit 56 repeats the processes in and after step S42.

As described above, the spot color objects are aggregated in accordance with the type of the spot color object, and are placed on the spot color layers each provided for each type in the present embodiment. Thus, the image forming apparatus, which has received the image file data after the aggregation, may perform printing of the same types of spot colors at one time by performing the printing per spot color layer. This can reduce the number of times of printing when an image including a plurality of types of spot color objects is printed. This can print the image efficiently.

An embodiment aggregates the spot color objects into layers for each of types of the spot color objects (or each of spot colors or spot color printing methods such as a surface effect). Thus, the image forming apparatus can perform the same type of spot color printing process at one time in an aggregated manner by performing printing processes for each of the layers. This enables an image forming apparatus that can perform spot color printing only in one color at one time to more efficiently print an image including spot color objects in a plurality of colors in a smaller number of times of printing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
an object aggregating unit configured to aggregate spot color objects that are objects reflecting drawing information including spot color information of a plurality of spot color inks to be used in printing, for each of plural types of the spot color information, to place the spot color objects on spot color layers for the respective types;
a layer generating unit configured to generate the spot color layers in front of a layer on which other objects to be drawn with an ink other than the spot color inks are aggregated and placed; and
an overlapping area removing unit configured to determine, when there is an overlapping area in which a drawing area of a first spot color object amongst the spot color objects overlaps with a drawing area of a second object that is amongst said other objects and is disposed in front of the first spot color object, whether the second spot color object is in a clear color, and when the second spot color object is not in a clear color, the overlapping area removing unit, to remove the overlapping area from the drawing area of the first spot color object and generate a new spot color object in which the overlapping area has been removed from the drawing area of the first spot color object, and replace the first spot color object with the new spot color object,
wherein the object aggregating unit places the new spot color object having a shape from which the overlapping area is removed on a spot color layer generated in front of the layer on which said other objects in colors other than the spot colors are aggregated and placed, and
wherein when the second spot color object is in a clear color, the first spot color object having an original shape is placed on the spot color layer without removing the overlapping area from the first spot color object, and the new spot color object does not replace the first spot color object.

2. The information processing apparatus according to claim 1, further comprising:
a collectively editing unit configured to collectively edit the drawing information about the spot color objects aggregated on the same spot color layer.

3. The information processing apparatus according to claim 1, further comprising:
a user interface to receive a selection via a user interface menu of one of a first setting and a second setting, after aggregating the spot color objects on the spot color layers,
wherein upon selection of the first setting, an original image file before the aggregation and an image file after the aggregation are stored in a storage unit, and
wherein upon selection of the second setting, an image file after the aggregation is stored in the storage unit by replacing an original image file before the aggregation with the image file after the aggregation.

4. An information processing method in an information processing apparatus, the method comprising:
(a) aggregating spot color objects that are objects reflecting drawing information including spot color information of a plurality of spot color inks to be used in printing, for each of plural types of the spot color information, to place the spot color objects on spot color layers for the respective types;
(b) generating the spot color layers in front of a layer on which other objects to be drawn with an ink other than the spot color inks are aggregated and placed;
(c) determining, when there is an overlapping area in which the drawing area of the first spot color object among the spot color objects overlaps with a drawing area of a second object that is amongst said other objects and is disposed in front of the first spot color object, whether the second spot color object is in a clear color;
(d) when it is determined in (c) that the second spot color object is not in a clear color removing the overlapping area from the drawing area of the first spot color object, generating a new spot color object in which the overlapping area has been removed from the drawing area of the first spot color object, replacing the first spot color object with the new spot color object, and placing the new spot color object having a shape from which the overlapping area is removed on a spot color layer generated in front of the layer on which said other objects in colors other than the spot colors are aggregated and placed; and
(e) when it is determined in (c) that the second spot color object is in a clear color, placing the first spot color object having an original shape on the spot of color layer without removing the overlapping area from the first spot color object and without replacing the first spot color object with the new spot color object.

5. A computer program product comprising a non-transitory computer-readable medium containing an information processing program, the program causing a computer to perform:
(a) aggregating spot color objects that are objects reflecting drawing information including spot color information of a plurality of spot color inks to be used in printing, for each of plural types of the spot color information, to place the spot color objects on spot color layers for the respective types;
(b) generating the spot color layers in front of a layer on which other objects to be drawn with an ink other than the spot color inks are aggregated and placed;
(c) determining, when there is an overlapping area in which the drawing area of the first spot color object among the spot color objects overlaps with a drawing area of a second object that is amongst said other objects and is disposed in front of the first spot color object, whether the second spot color object is in a clear color;

(d) when it is determined in (c) that the second spot color object is not in a clear color, removing the overlapping area from the drawing area of the first spot color object, generating a new spot color object in which the overlapping area has been removed from the drawing area of the first spot color object, replacing the first spot color object with the new spot color object, and placing the new spot color object having a shape from which the overlapping area is removed on a spot color layer generated in front of the layer on which said other objects in colors other than the spot colors are aggregated and placed; and (e) when it is determined in (c) that the second spot color object is in a clear color, placing the first spot color object having an original shape on the spot of color layer without removing the overlapping area from the first spot color object and without replacing the first spot color object with the new spot color object.

\* \* \* \* \*